(12) United States Patent
Woollen et al.

(10) Patent No.: US 11,360,981 B2
(45) Date of Patent: *Jun. 14, 2022

(54) SERVICING DATABASE REQUESTS USING CANONICALIZED TABLES

(71) Applicant: SIGMA COMPUTING, INC., San Francisco, CA (US)

(72) Inventors: Robert C. Woollen, San Rafael, CA (US); Kenneth Truong, Temple City, CA (US); Jason D. Frantz, San Francisco, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 16/913,065

(22) Filed: Jun. 26, 2020

(65) Prior Publication Data

US 2020/0409956 A1 Dec. 31, 2020

Related U.S. Application Data

(60) Provisional application No. 62/867,437, filed on Jun. 27, 2019.

(51) Int. Cl.
*G06F 16/2455* (2019.01)
*G06F 16/22* (2019.01)

(52) U.S. Cl.
CPC .... *G06F 16/24553* (2019.01); *G06F 16/2282* (2019.01)

(58) Field of Classification Search
CPC .... G06F 40/18; G06F 16/254; G06F 16/2282; G06F 16/245; G06F 16/24553; G06F 16/248; G06F 40/106; G06F 16/258; G06F 16/90335
USPC .......................................................... 707/713
See application file for complete search history.

(56) References Cited

U.S. PATENT DOCUMENTS

| | | | |
|---|---|---|---|
| 6,718,820 B2* | 4/2004 | Kwon | G01N 3/48 73/81 |
| 2002/0095399 A1* | 7/2002 | Devine | G06F 16/958 |
| 2009/0319501 A1* | 12/2009 | Goldstein | G06F 16/2452 |
| 2018/0150533 A1* | 5/2018 | Mathur | G06F 16/9535 |

* cited by examiner

*Primary Examiner* — Hung T Vy

(57) ABSTRACT

Servicing database requests using canonicalized tables including maintaining a canonical table repository of canonicalized tables, wherein each canonicalized table is a transformed version of a table previously retrieved from a database; receiving, from a client computing system, a request for a table from the database; generating a description of a canonical version of the requested table; determining whether the canonical version of the requested table matches a canonicalized table in the canonical table repository; and if the canonical version of the requested table matches the canonicalized table in the canonical table repository: transforming the matching canonicalized table based on the received request for the table; and providing, to the client computing system, the transformed matching canonicalized table.

17 Claims, 5 Drawing Sheets

SERVICING DATABASE REQUESTS USING CANONICALIZED TABLES

CROSS-REFERENCE TO RELATED APPLICATION

This application is a non-provisional application for patent entitled to a filing date and claiming the benefit of earlier-filed U.S. Provisional Patent Application Ser. No. 62/867,437, filed Jun. 27, 2019.

BACKGROUND

Field of the Invention

The field of the invention is data processing, or, more specifically, methods, apparatus, and products for servicing database requests using canonicalized tables.

Description of Related Art

Modern businesses may store large amounts of data in remote databases within cloud-based data warehouses. This data may be accessed using database query languages, such as structured query language (SQL). Manipulating the data stored in the database may require constructing complex queries beyond the abilities of most users. Further, each query issued to the cloud-based data warehouse may incur a cost and require time to wait for the response.

SUMMARY

Methods, systems, and apparatus for servicing database requests using canonicalized tables. Servicing database requests using canonicalized tables includes maintaining a canonical table repository of canonicalized tables, wherein each canonicalized table is a transformed version of a table previously retrieved from a database; receiving, from a client computing system, a request for a table from the database; generating a description of a canonical version of the requested table; determining whether the canonical version of the requested table matches a canonicalized table in the canonical table repository; and if the canonical version of the requested table matches the canonicalized table in the canonical table repository: transforming the matching canonicalized table based on the received request for the table; and providing, to the client computing system, the transformed matching canonicalized table.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
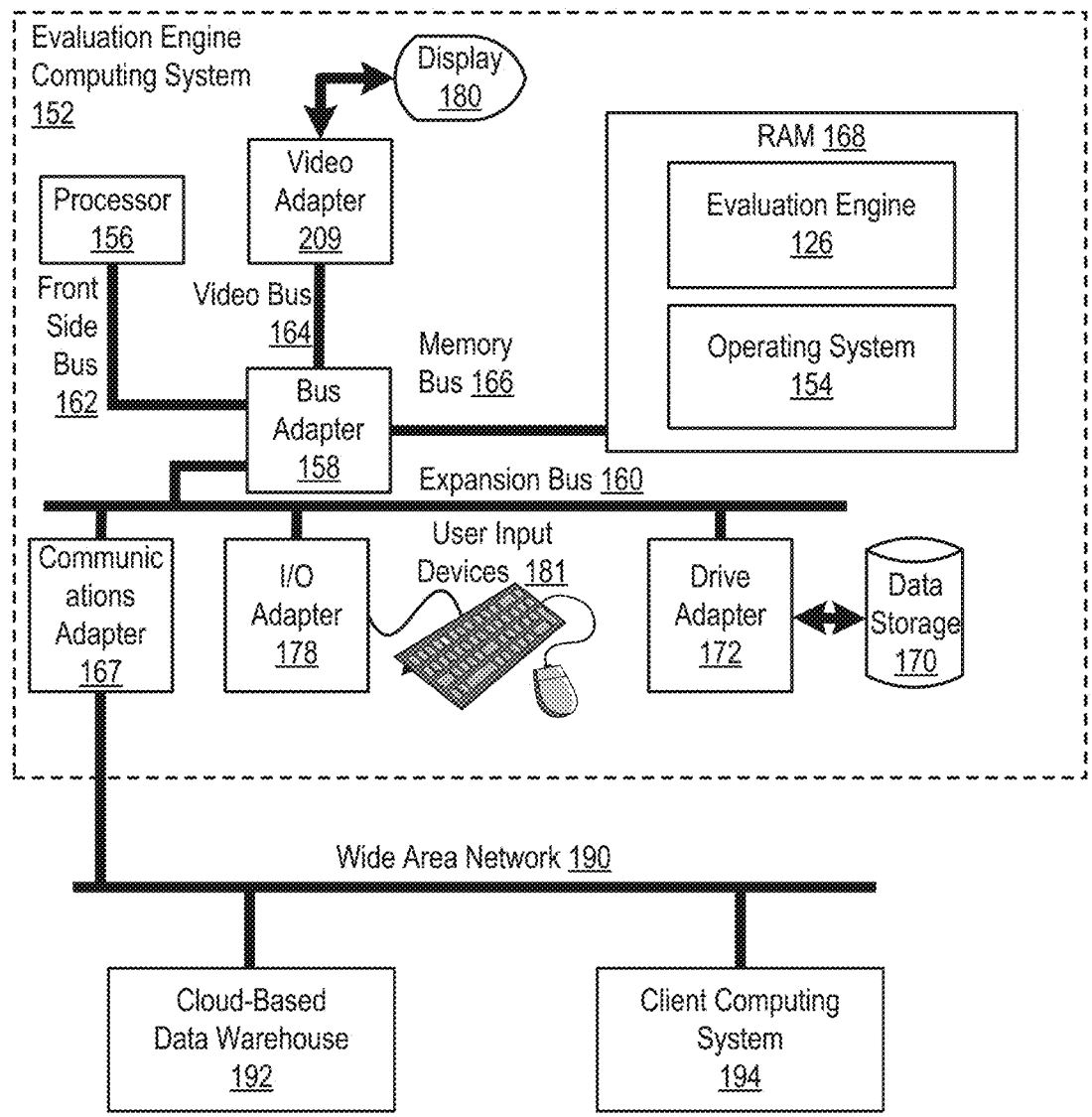
FIG. 1 sets forth a block diagram of an example system configured for servicing database requests using canonicalized tables according to embodiments of the present invention.

Exemplary methods, apparatus, and products for servicing database requests using canonicalized tables in accordance with the present invention are described with reference to the accompanying drawings, beginning with FIG. 1. FIG. 1 sets forth a block diagram of automated computing machinery comprising an exemplary computing system (152) configured for servicing database requests using canonicalized tables according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an operating system (154). Operating systems useful in computers configured for servicing database requests using canonicalized tables according to embodiments of the present invention include UNIX™, Linux™, Microsoft Windows™, AIX™ IBM's i OS™, and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is the evaluation engine (126), a module for servicing database requests using canonicalized tables according to embodiments of the present invention.

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for servicing database requests using canonicalized tables according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for servicing database requests using canonicalized tables according to embodiments of the present invention include modems for wired dial-up communications, Ethernet (IEEE 802.3) adapters for wired data communications, and 802.11 adapters for wireless data communications.

The communications adapter (167) is communicatively coupled to a wide area network (190) that also includes a cloud-based data warehouse (192) and a client system (194). The cloud-based data warehouse (192) is a computing system or group of computing systems that hosts a database for access over the wide area network (190). The client system (194) is a computing system that accesses the database using the evaluation engine (126) on the computing system (152).

Figure 2:
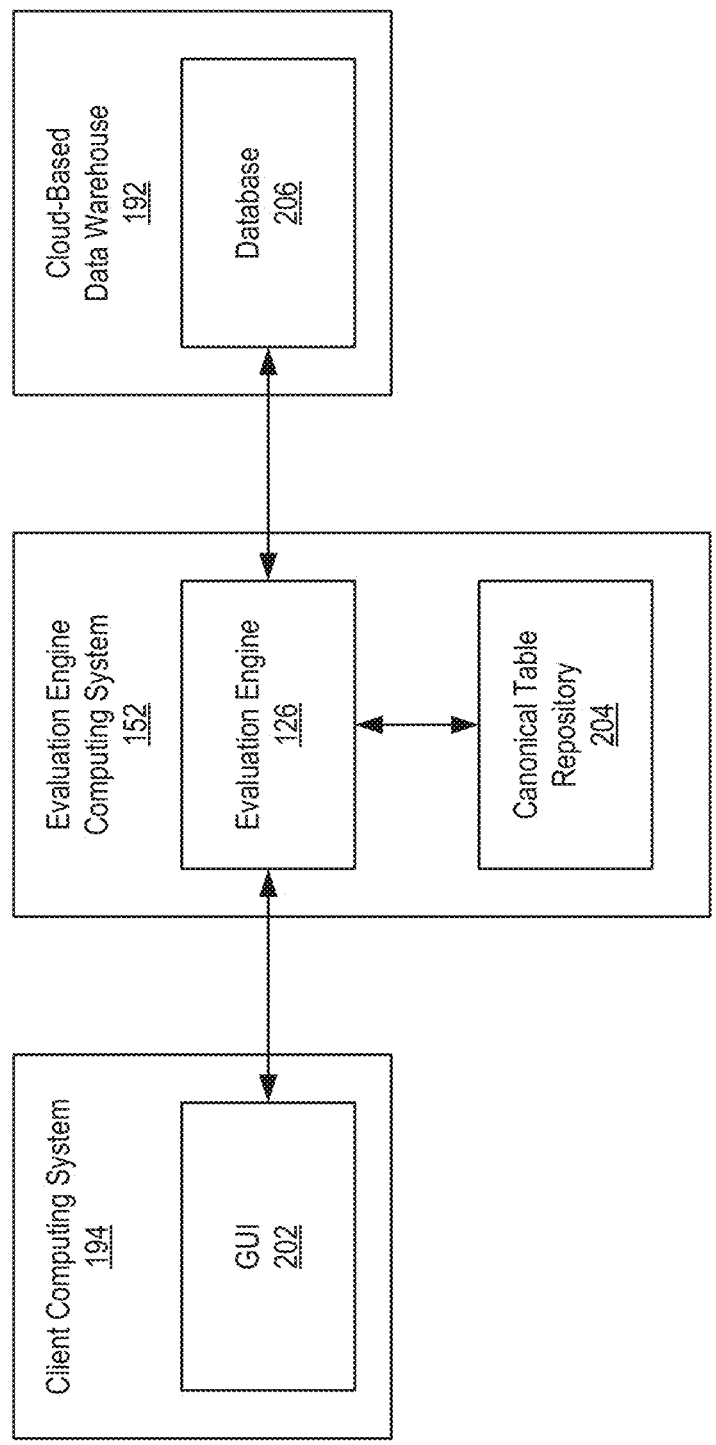
FIG. 2 sets forth a block diagram of an example system configured for servicing database requests using canonicalized tables according to embodiments of the present invention.

FIG. 2 shows an exemplary system for servicing database requests using canonicalized tables according to embodiments of the present invention. As shown in FIG. 2, the system includes a client computing system (194), an evaluation engine computing system (152), and a cloud-based data warehouse (192). The client computing system (194) includes a graphical user interface (GUI) (202). The evaluation engine computing system (152) includes an evaluation engine (126) and a canonical table repository (204). The cloud-based data warehouse (192) includes a database (206).

The GUI (202) is a visual presentation configured to present tables in the form of worksheets and graphical elements to a user. The GUI (202) also receives requests from a user for tables from the database (206). The GUI (202) may be presented, in part, by the evaluation engine (126) and displayed on a client computing system (194) (e.g., on a system display or mobile touchscreen). The GUI (202) may be part of an Internet application that includes the evaluation engine (126) and is hosted on the evaluation engine computing system (152).

The database (206) is a collection of data and a management system for the data. A table is a collection of data from the database (206). Tables may be organizations of data sets generated in response to a database query and provided to the evaluation engine (126). Tables include data sets organized into columns and rows. The particular columns, rows, and organization of the columns and rows that make up a table may be specified in the database query requesting the table. A table, as sent from the database to the evaluation engine (126) and client computing system (194), may be a portion or subset of a source database table on the database.

The evaluation engine (126) is hardware, software, or an aggregation of hardware and software configured to receive requests from the client computing system (194), via the GUI (GUI). The evaluation engine (126) is also configured to generate database queries in response to requests for data sets and manipulations of those data sets. The evaluation engine (126) may be part of a database query generator that generates the database query.

The canonical table repository (204) is an aggregation of hardware and software used to store canonicalized tables. A canonicalized table is a version of a table configured for comparison and matching. Canonicalized tables may be used to determine if one table includes the same root data set as another table (or group of tables) stored in the canonical table repository (204). Canonicalized tables may arrange the columns and rows in a particular order that differs from the order of columns and rows in the associated table as presented in a worksheet for the user or as stored as the source database table in the database. Further, canonicalized tables may have mutable labels or information in the table (e.g., column and row titles) converted to absolute location information (e.g., column or row number of the source database table).

For example, a user may request a table that includes a particular arrangement of the first ten rows and first ten columns from a database table. The evaluation engine (126) may convert the requested table into a description of the canonicalized version of the table that has a different arrangement of the same ten rows and ten columns form the database table. The evaluation engine (126) may then search the canonical table repository (204) for a canonicalized table that matches the canonicalized version of the requested table. If a matching canonicalized table exists, then the evaluation engine (126) manipulates the canonicalized table into the requested table without having to issue a database query to the database. If a matching canonicalized table does not exist, then the evaluation engine (126) issues a database query to the database, receives the requested table, provides the requested table to the user, then converts the requested table into a canonicalized table and stores the table in the canonical table repository (204). Accordingly, each table retrieved from the database (or the most recent tables) are stored as canonicalized versions in the canonical table repository (204). The manner in which the received tables are converted into canonical version may be referred to as the canonical conversion policy.

As a specific example, assume that the evaluation engine (126) retrieves the following table from a database that lists the populations of New York, Michigan, Washington, Minnesota, Idaho, New Hampshire, Maine, Montana, North Dakota, and Vermont in the years 2016, 2017, and 2018, and sorted from largest to smallest population in 2018. Table 1 shows the retrieved and presented table.

TABLE 1

| State | 2016 | 2017 | 2018 |
|---|---|---|---|
| New York | 19,641,589 | 19,590,719 | 19,542,209 |
| Michigan | 9,951,890 | 9,976,447 | 9,995,915 |
| Washington | 7,294,680 | 7,425,432 | 7,535,591 |
| Minnesota | 5,523,409 | 5,568,155 | 5,611,179 |
| Idaho | 1,682,930 | 1,718,904 | 1,754,208 |
| New Hampshire | 1,342,373 | 1,349,767 | 1,356,458 |
| Maine | 1,331,370 | 1,335,063 | 1,338,404 |
| Montana | 1,040,863 | 1,053,090 | 1,062,305 |
| North Dakota | 754,353 | 755,176 | 760,077 |
| Vermont | 623,644 | 624,525 | 626,299 |

Upon receiving the above table from the database, the evaluation engine may convert the table to a canonicalized table by removing the row column labels and resorting the rows base on the row location in the source database table. Table 2 shows the resulting canonicalized table.

TABLE 2

|        | Col: 8     | Col: 9     | Col: 10    |
|--------|------------|------------|------------|
| Row: 14 | 1,682,930  | 1,718,904  | 1,754,208  |
| Row: 21 | 1,331,370  | 1,335,063  | 1,338,404  |
| Row: 24 | 9,951,890  | 9,976,447  | 9,995,915  |
| Row: 25 | 5,523,409  | 5,568,155  | 5,611,179  |
| Row: 28 | 1,040,863  | 1,053,090  | 1,062,305  |
| Row: 31 | 1,342,373  | 1,349,767  | 1,356,458  |
| Row: 34 | 19,641,589 | 19,590,719 | 19,542,209 |
| Row: 36 | 754,353    | 755,176    | 760,077    |
| Row: 47 | 623,644    | 624,525    | 626,299    |
| Row: 49 | 7,294,680  | 7,425,432  | 7,535,591  |

The canonical conversion policy may convert two different tables into identical canonicalized tables. Similarly, two different requests for tables from the database may result in the same canonicalized table being used to satisfy both requests. For example, a user may issue a first request for a table with a particular arrangement of rows and columns, and issue a second request for a different arrangement of the same rows and columns. The same canonical table may be used to satisfy both requests, although it will be transformed differently depending on the specific request.

Figure 3:
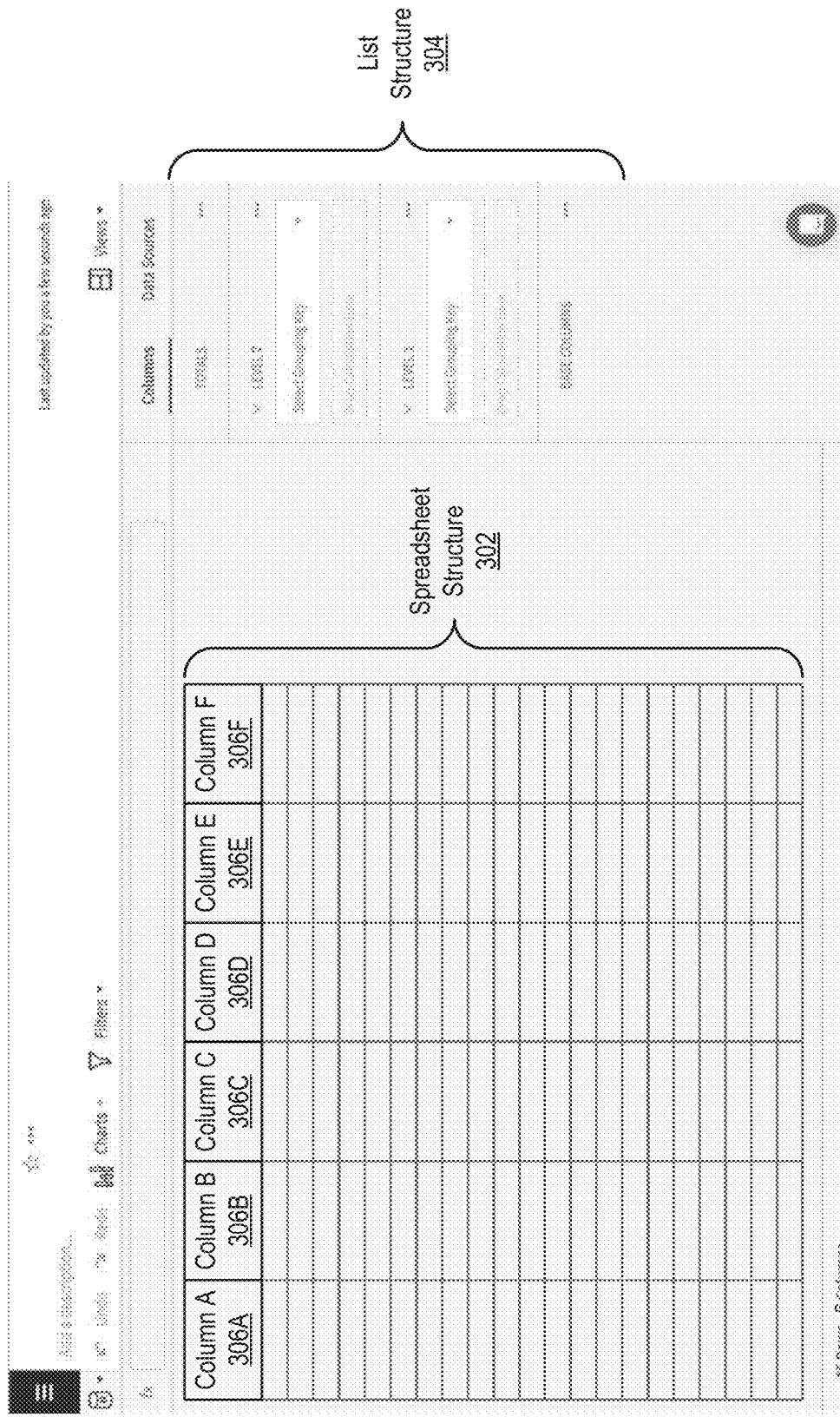
FIG. 3 sets forth a block diagram of an example system configured for servicing database requests using canonicalized tables according to embodiments of the present invention.

FIG. 3 shows an exemplary system for servicing database requests using canonicalized tables according to embodiments of the present invention. As shown in FIG. 3, the exemplary GUI (202) includes a spreadsheet structure (302), a list structure (304), and an exposable parameter (306). The spreadsheet structure (302) includes a worksheet (shown as empty rows) with six columns (column A (306A), column B (306B), column C (306C), column D (306D), column E (306E), column F (306F)).

The spreadsheet structure (302) is a graphical element and organizing mechanism for a worksheet that presents a table. A worksheet is a presentation of a table from a database (204). The spreadsheet structure (302) displays the worksheet as rows of data organized by columns (column A (306A), column B (306B), column C (306C), column D (306D), column E (306E), column F (306F)). The columns delineate different categories of the data in each row of the worksheet. The columns may also be calculations using other columns in the worksheet.

The list structure (304) is a graphical element used to define and organize the hierarchical relationships between the columns (column A (306A), column B (306B), column C (306C), column D (306D), column E (306E), column F (306F)) of the data set. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure (304) presents a dimensional hierarchy to the user. Specifically, the list structure (304) presents levels arranged hierarchically across at least one dimension. Each level within the list structure (304) is a position within a hierarchical relationship between columns (column A (306A), column B (306B), column C (306C), column D (306D), column E (306E), column F (306F)). The keys within the list structure (304) identify the one or more columns that are the participants in the hierarchical relationship. Each level may have more than one key.

One of the levels in the list structure (304) may be a base level. Columns selected for the base level provide data at the finest granularity. One of the levels in the list structure (304) may be a totals or root level. Columns selected for the totals level provide data at the highest granular level. For example, the totals level may include a field that calculates the sum of each row within a single column of the entire data set (i.e., not partitioned by any other column).

The GUI (202) may enable a user to drag and drop columns (column A (306A), column B (306B), column C (306C), column D (306D), column E (306E), column F (306F)) into the list structure (304). The order of the list structure (304) may specify the hierarchy of the columns relative to one another. A user may be able to drag and drop the columns in the list structure (304) at any time to redefine the hierarchical relationship between columns. The hierarchical relationship defined using the columns selected as keys in the list structure (304) may be utilized in charts such that drilling down (e.g., double click on a bar), enables a new chart to be generated based on a level lower in the hierarchy.

The GUI (202) may also include a mechanism for a user to request a table from a database to be presented as a worksheet in the GUI (202). Such a mechanism may be part of the interactivity of the worksheet. Specifically, a user may manipulate a worksheet (e.g., by dragging and dropping columns or rows, resorting columns or rows, etc.) and, in response, the GUI (202) may generate request (e.g., in the form of a state specification) for a table and send the request to the evaluation engine (126). Such a mechanism may also include a direct identification of the rows and columns of a database table that a user would like to access (e.g., via a selection of the rows and columns in a dialog box).

Figure 4:
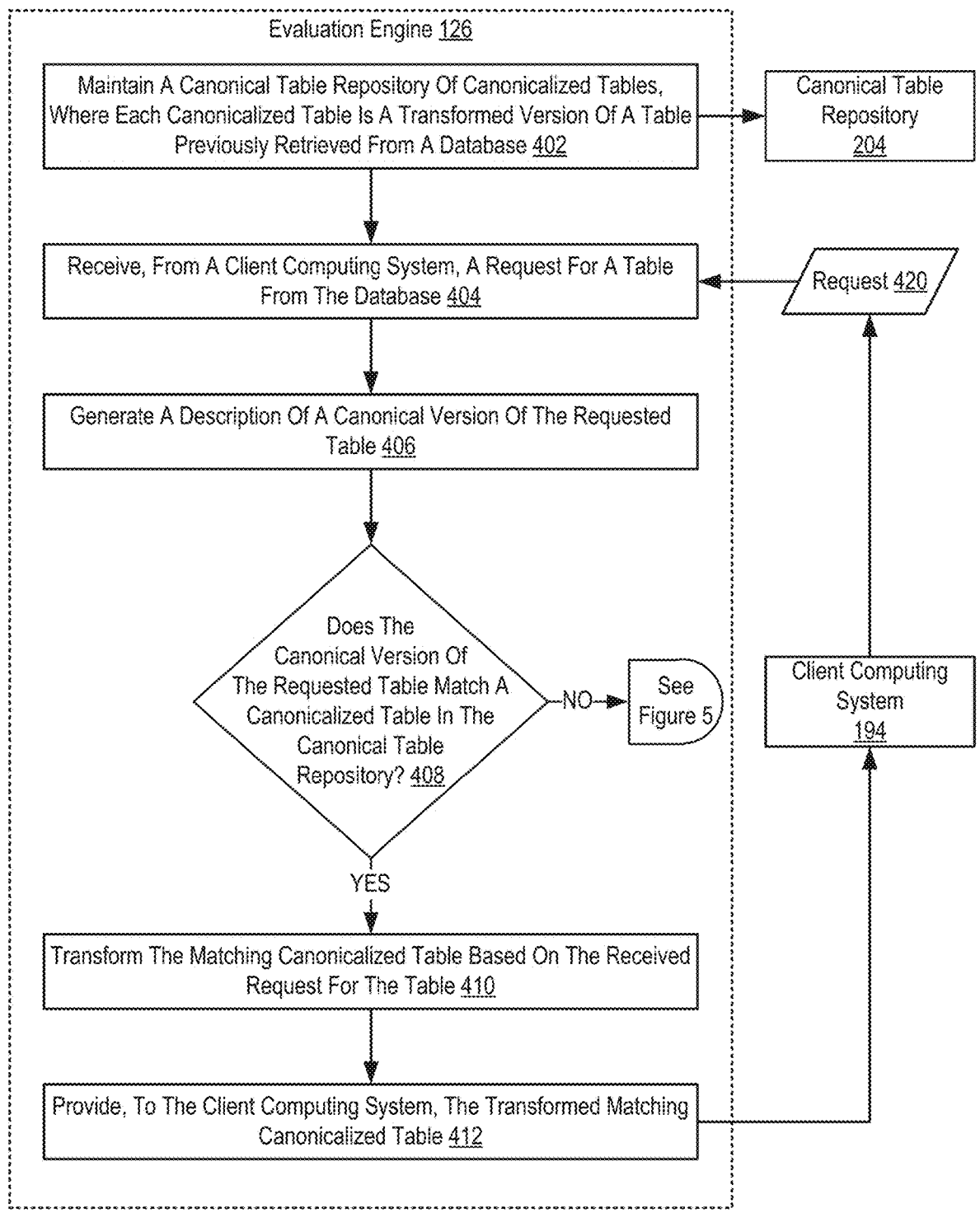
FIG. 4 sets forth a flow chart illustrating an exemplary method for servicing database requests using canonicalized tables according to embodiments of the present invention.

For further explanation, FIG. 4 sets forth a flow chart illustrating an exemplary method for servicing database requests using canonicalized tables according to embodiments of the present invention that includes maintaining (402) a canonical table repository (204) of canonicalized tables, wherein each canonicalized table is a transformed version of a table previously retrieved from a database. Maintaining (402) a canonical table repository (204) of canonicalized tables, wherein each canonicalized table is a transformed version of a table previously retrieved from a database may be carried out by the evaluation engine (126) converting each table received from the database into a canonicalized table and storing the canonicalized table in the canonical table repository (204). Maintaining (402) a canonical table repository (204) of canonicalized tables may also include removing canonicalized tables to make space available for new canonicalized tables. This may be performed based on a removal policy, such as removing tables that have not been accessed in the longest period of time.

The canonicalized tables within the canonical table repository (204) may be indexed by worksheet specifications describing each canonicalized table. Specifically, each canonicalized table may be associated with a worksheet specification that describes the canonicalized table. Each worksheet specification may describe the source database table, rows, and columns of the associated canonicalized table. For example, a database may include a source database table referred to as "state_census_50yrs" that includes census data for each state from 2010 to 2018. A table retrieved from the database may have the columns for 2014, 2015, and 2016, and the rows for Alabama, Florida, Louisiana, Mississippi, and Texas. The worksheet specification may include the name of the source data worksheet and a description of the 2014, 2015, and 2016 columns and the Alabama, Florida, Louisiana, Mississippi, and Texas rows.

In a canonical description, the worksheet specification may be "dbtable:state_census_50yr; col:6,7,8; row:2,11,20,26, 45". The worksheet specification may then be used to match a similar description of a requested table to a canonicalized table stored in the canonical table repository (204).

The method of FIG. 4 further includes receiving (404), from a client computing system (194), a request (420) for a table from the database. Receiving (404), from a client computing system (194), a request (420) for a table from the database may be carried out by the evaluation engine (126) detecting, via a GUI, that a user has manipulated a worksheet or other element displayed within a GUI on the client computing system (194). Such manipulations may include dragging and dropping columns or rows, resorting columns or rows, or identifying rows and columns of a database table that the user would like to access (e.g., via a selection of the rows and columns in a dialog box). In response, the GUI may generate the request (420) (e.g., in the form of a state specification) for a table and send the request to the evaluation engine (126).

The method of FIG. 4 further includes generating (406) a description of a canonical version of the requested table. Generating (406) a description of a canonical version of the requested table may be carried out by the evaluation engine (126) evaluating the request (420) and converting the request (420) into a form to be used to attempt to match the requested table to a canonical table in the canonical table repository (204). The description of a canonical version of the requested table may be in the form of a worksheet specification as described above.

The method of FIG. 4 further includes determining (408) whether the canonical version of the requested table matches a canonicalized table in the canonical table repository (204). Determining (408) whether the canonical version of the requested table matches a canonicalized table in the canonical table repository (204) may be carried out by the evaluation engine (126) comparing the description of the canonical version of the requested table to a description of each canonicalized table in the canonical table repository (204) until a match is found. A match may be an exact match between the description of the canonical version of the requested table and the canonicalized table, such as an exact match between a worksheet specification for the requested table and the worksheet specification associated with a canonicalized table in the canonical table repository (204).

For example, assume that the user requests a table from the database (as shown in Table 1) that lists the populations of New York, Michigan, Washington, Minnesota, Idaho, New Hampshire, Maine, Montana, North Dakota, and Vermont in the years 2016, 2017, and 2018, and sorted from largest to smallest population in 2018. The evaluation engine (126) may generate a description of a canonical version of the requested table by converting the row and column labels to absolute values of the row and column numbers of the source database table and reorder the rows based on the absolute values. The resulting worksheet specification (i.e., the description of the canonical version of the requested table) may be generated as "dbtable:state_census_50yr; col: 8,9,10; row:14,21,24,25,28,31,34,36,47,49". The evaluation engine (126) may then search the canonical table repository (204) for a matching canonicalized table (e.g., by comparing worksheet specifications). If the canonical table repository (204) includes Table 2, then a match has been found.

Determining (408) whether the canonical version of the requested table matches a canonicalized table in the canonical table repository (204) may be carried out by determining whether the canonical version of the requested table may be generated using at least two canonicalized tables in the canonical table repository (204). Specifically, the evaluation engine (126) may determine whether the description of the canonical version of the requested table may be satisfied using more than one canonicalized table in the canonical table repository (204).

For example, assume that the canonical table repository (204) includes two tables with the worksheet descriptions "dbtable:state_census_50yr; col:8,9,10; row:14,21,24,25, 28" and "dbtable:state_census_50yr; col:8,9,10; row: 31,34, 36,47,49". If the user requests Table 1, above, with the converted worksheet description "dbtable: state_census_50yr; col:8,9,10; row:14,21,24,25,28,31,34, 36,47,49", then the evaluation engine (126) will determine that the request can be satisfied using both table "dbtable: state_census_50yr; col:8,9,10; row:14,21,24,25,28" and table "dbtable:state_census_50yr; col:8,9,10; row: 31,34,36, 47,49".

The method of FIG. 4 further includes if the canonical version of the requested table matches the canonicalized table in the canonical table repository: transforming (410) the matching canonicalized table based on the received request (420) for the table; and providing (412), to the client computing system (194), the transformed matching canonicalized table. Transforming (410) the matching canonicalized table based on the received request (420) for the table may be carried out by the evaluation engine (126) retrieving the matching canonicalized table or tables from the canonical table repository (204) and altering the canonicalized table or tables in accordance with the request. Such alterations may include converting the absolute row and column values to row and column labels and resorting the columns and/or rows. Transforming (410) the matching canonicalized table based on the received request (420) for the table may include combining more than one canonicalized table into the requested table.

Providing (412), to the client computing system (194), the transformed matching canonicalized table may be carried out by the evaluation engine (126) presenting, via the GUI on the client computing system (194), the transformed matching canonicalized table as a worksheet to the user. Providing (412), to the client computing system (194), the transformed matching canonicalized table may bypass retrieving the requested table from the database. Specifically, because the table or tables were retrieved locally from the canonical table repository (204), no request or transfer between the evaluation engine (126) and the cloud-based data warehouse (192) was required. The requested table is provided without involving the database on the cloud-based data warehouse (192).

The above limitations improve the operation of the computer system by servicing table requests from a user without issuing a query to a database and without the increased latency of database interaction. This is accomplished by retrieving previously received tables from a local canonical table repository (204). Further, because the tables are stored as canonicalized versions of the tables, more requested tables will match previously stored table than if the tables were stored in the form as received from the database.

Figure 5:
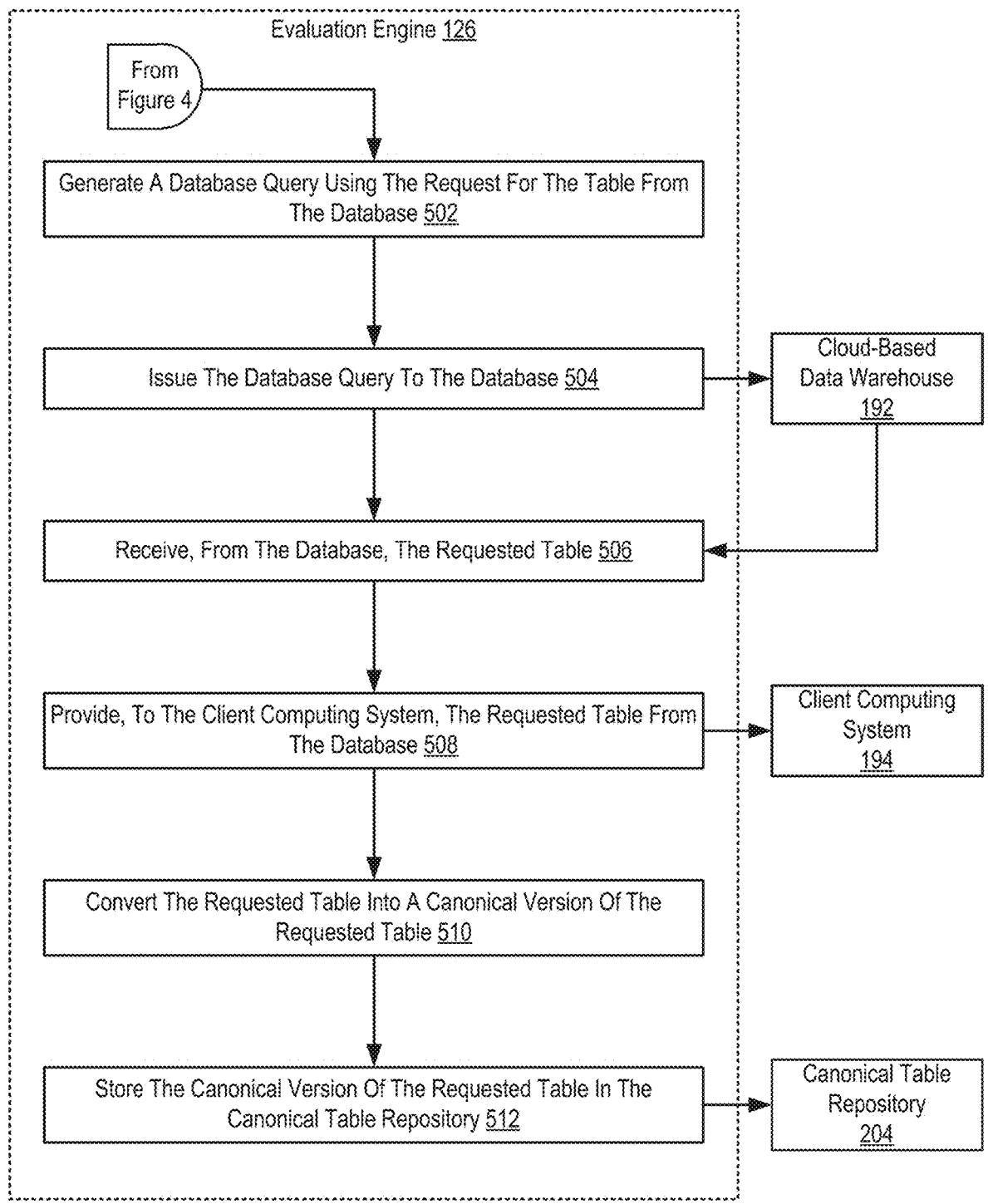
FIG. 5 sets forth a flow chart illustrating an exemplary method for servicing database requests using canonicalized tables according to embodiments of the present invention.

For further explanation, FIG. 5 sets forth a flow chart illustrating a further exemplary method for servicing database requests using canonicalized tables according to embodiments of the present invention that continues the flow chart described in FIG. 4. Specifically, as shown in FIG. 5, if the canonical version of the requested table does not match any the canonicalized table in the canonical table repository: generating (502) a database query using the request for the table from the database; issuing (504) the database query to the database; receiving (506), from the database, the requested table; providing (508), to the client computing system (194), the requested table from the database; converting (510) the requested table into a canonical version of the requested table; and storing (512) the canonical version of the requested table in the canonical table repository (204).

Generating (502) a database query using the request for the table from the database may be carried out by the evaluation engine (126) using the request (420) to populate the database query targeting the database on the cloud-based data warehouse (192). The database query (620) may be an SQL statement. Issuing (504) the database query to the database may be carried out by the evaluation engine (126) sending the generated database query over a wide area network to the database on the cloud-based data warehouse (192).

Receiving (506), from the database, the requested table may be carried out by the evaluation engine (126) receiving a database query response that includes the requested table from the database. The received table may be in a form that matches or largely matches the requested table. Once received, the table may undergo some conversion to a form that matches the requested table and prepares the received table for presentation to the client as a worksheet. Providing (508), to the client computing system (194), the requested table from the database may be carried out by the evaluation engine (126) presenting, via the GUI on the client computing system (194), the received table as a worksheet to the user.

Converting (510) the requested table into a canonical version of the requested table may be carried out by the evaluation engine (126) altering the requested (and received) table based on the canonical conversion policy. Converting (510) the requested table into the canonical version of the requested table may include altering column and/or row labels and reordering one or more columns and/or rows. Storing (512) the canonical version of the requested table in the canonical table repository (204) may be carried out by the evaluation engine (126) generating a worksheet specification for the canonicalized table and storing the canonicalized table in the canonical table repository (204) indexed by the generated worksheet specification.

In view of the explanations set forth above, readers will recognize that the benefits of servicing database requests using canonicalized tables according to embodiments of the present invention include:
  Improving the operation of a computing system by servicing database requests using a local repository and without issuing a query to a database, increasing computing system efficiency.
  Improving the operation of a computing system by servicing database requests without the increased latency of database interaction, increasing computing system responsiveness.

Exemplary embodiments of the present invention are described largely in the context of a fully functional computer system for servicing database requests using canonicalized tables. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of servicing database requests using canonicalized tables, the method comprising:
   maintaining a canonical table repository of canonicalized tables, wherein each canonicalized table is a transformed version of a table previously retrieved from a database;
   receiving, from a client computing system, a request for a table from the database;
   generating a description of a canonical version of the requested table;
   determining whether the canonical version of the requested table matches a canonicalized table in the canonical table repository;
   if the canonical version of the requested table matches the canonicalized table in the canonical table repository:
      transforming the matching canonicalized table based on the received request for the table; and
      providing, to the client computing system, the transformed matching canonicalized table; and
   if the canonical version of the requested table does not match any canonicalized table in the canonical table repository:
      generating a database query using the request for the table from the database;
      issuing the database query to the database;
      receiving, from the database, the requested table;
      providing, to the client computing system, the requested table from the database;
      converting the requested table into a canonical version of the requested table; and
      storing the canonical version of the requested table in the canonical table repository.

2. The method of claim 1, wherein converting the requested table into the canonical version of the requested table comprises reordering at least one column in the requested table.

3. The method of claim 1, wherein determining whether the canonical version of the requested table matches the canonicalized table in the canonical table repository comprises determining whether the canonical version of the requested table is able to be generated using at least two canonicalized tables in the canonical table repository.

4. The method of claim 1, wherein receiving, from the client computing system, the request for the table from the database comprises detecting that a user has manipulated a worksheet displayed within a graphical user interface on the client computing system.

5. The method of claim 1, wherein providing, to the client computing system, the transformed matching canonicalized table bypasses retrieving the requested table from the database.

6. The method of claim 1, wherein the canonicalized tables within the canonical table repository are indexed by worksheet specifications describing each canonicalized table.

7. An apparatus for servicing database requests using canonicalized tables, the apparatus comprising a computer processor, a computer memory operatively coupled to the computer processor, the computer memory having disposed within it computer program instructions that, when executed by the computer processor, cause the apparatus to carry out the steps of:
 maintaining a canonical table repository of canonicalized tables, wherein each canonicalized table is a transformed version of a table previously retrieved from a database;
 receiving, from a client computing system, a request for a table from the database;
 generating a description of a canonical version of the requested table;
 determining whether the canonical version of the requested table matches a canonicalized table in the canonical table repository;
 if the canonical version of the requested table matches the canonicalized table in the canonical table repository:
  transforming the matching canonicalized table based on the received request for the table; and
  providing, to the client computing system, the transformed matching canonicalized table; and
 if the canonical version of the requested table does not match any canonicalized table in the canonical table repository:
  generating a database query using the request for the table from the database;
  issuing the database query to the database;
  receiving, from the database, the requested table;
  providing, to the client computing system, the requested table from the database;
  converting the requested table into a canonical version of the requested table; and
  storing the canonical version of the requested table in the canonical table repository.

8. The apparatus of claim 7, wherein converting the requested table into the canonical version of the requested table comprises reordering at least one column in the requested table.

9. The apparatus of claim 7, wherein determining whether the canonical version of the requested table matches the canonicalized table in the canonical table repository comprises determining whether the canonical version of the requested table is able to be generated using at least two canonicalized tables in the canonical table repository.

10. The apparatus of claim 7, wherein receiving, from the client computing system, the request for the table from the database comprises detecting that a user has manipulated a worksheet displayed within a graphical user interface on the client computing system.

11. The apparatus of claim 7, wherein providing, to the client computing system, the transformed matching canonicalized table bypasses retrieving the requested table from the database.

12. The apparatus of claim 7, wherein the canonicalized tables within the canonical table repository are indexed by worksheet specifications describing each canonicalized table.

13. A computer program product for servicing database requests using canonicalized tables, the computer program product disposed upon a computer readable medium, the computer program product comprising computer program instructions that, when executed, cause a computer to carry out the steps of:
 maintaining a canonical table repository of canonicalized tables, wherein each canonicalized table is a transformed version of a table previously retrieved from a database;
 receiving, from a client computing system, a request for a table from the database;
 generating a description of a canonical version of the requested table;
 determining whether the canonical version of the requested table matches a canonicalized table in the canonical table repository;
 if the canonical version of the requested table matches the canonicalized table in the canonical table repository:
  transforming the matching canonicalized table based on the received request for the table; and
  providing, to the client computing system, the transformed matching canonicalized table; and
 if the canonical version of the requested table does not match any canonicalized table in the canonical table repository:
  generating a database query using the request for the table from the database;
  issuing the database query to the database;
  receiving, from the database, the requested table;
  providing, to the client computing system, the requested table from the database;
  converting the requested table into a canonical version of the requested table; and
  storing the canonical version of the requested table in the canonical table repository.

14. The computer program product of claim 13, wherein converting the requested table into the canonical version of the requested table comprises reordering at least one column in the requested table.

15. The computer program product of claim 13, wherein determining whether the canonical version of the requested table matches the canonicalized table in the canonical table repository comprises determining whether the canonical version of the requested table is able to be generated using at least two canonicalized tables in the canonical table repository.

16. The computer program product of claim 13, wherein receiving, from the client computing system, the request for the table from the database comprises detecting that a user has manipulated a worksheet displayed within a graphical user interface on the client computing system.

17. The computer program product of claim 13, wherein providing, to the client computing system, the transformed matching canonicalized table bypasses retrieving the requested table from the database.

* * * * *